(12) United States Patent
Shin et al.

(10) Patent No.: US 10,875,407 B2
(45) Date of Patent: Dec. 29, 2020

(54) METHOD AND SYSTEM FOR DRIVING HYBRID VEHICLE

(71) Applicants: HYUNDAI MOTOR COMPANY, Seoul (KR); KIA MOTORS CORPORATION, Seoul (KR)

(72) Inventors: Ho Joon Shin, Suwon-si (KR); Chae Duck Chon, Hwaseong-si (KR); HeonYoung Kwak, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 200 days.

(21) Appl. No.: 16/173,543

(22) Filed: Oct. 29, 2018

(65) Prior Publication Data

US 2019/0344671 A1     Nov. 14, 2019

(30) Foreign Application Priority Data

May 10, 2018   (KR) ........................ 10-2018-0053563

(51) Int. Cl.
| | |
|---|---|
| *B60L 15/02* | (2006.01) |
| *B60K 6/20* | (2007.10) |
| *B60L 15/20* | (2006.01) |
| *B60W 10/08* | (2006.01) |

(Continued)

(52) U.S. Cl.
CPC ............. *B60L 15/025* (2013.01); *B60K 6/20* (2013.01); *B60L 15/2054* (2013.01); *B60W 10/08* (2013.01); *B60W 20/00* (2013.01); *B60W 30/188* (2013.01); *B60L 2240/421* (2013.01); *B60L 2240/423* (2013.01); *B60L 2240/427* (2013.01); *B60L 2240/429* (2013.01);

(Continued)

(58) Field of Classification Search
CPC .............. B60L 15/025; B60L 15/2054; B60L 2240/421; B60L 2240/423; B60L 2240/427; B60L 2240/429; B60K 6/20; B60W 10/08; B60W 20/00; B60W 30/188; B60W 2510/081; B60W 2510/083; B60W 2710/083

See application file for complete search history.

(56) References Cited

U.S. PATENT DOCUMENTS

| | | | | |
|---|---|---|---|---|
| 2004/0046519 | A1* | 3/2004 | Leonardi | ................. B60L 50/16 318/432 |
| 2009/0062052 | A1* | 3/2009 | Kim | ..................... B60W 10/08 475/5 |
| 2011/0062909 | A1* | 3/2011 | Patel | ...................... B60L 50/61 318/400.32 |

FOREIGN PATENT DOCUMENTS

| | | |
|---|---|---|
| KR | 10-2009-0062343 A | 6/2009 |
| KR | 10-2012-0060068 A | 6/2012 |

* cited by examiner

*Primary Examiner* — Aaron L Troost
(74) *Attorney, Agent, or Firm* — Morgan, Lewis & Bockius LLP (57) ABSTRACT

A method and a system for driving a hybrid vehicle are provided for determining whether the hybrid vehicle is driven in a sensorless control mode or not by estimating a rotor position value based on electric current and voltage of a drive motor. Such a hybrid vehicle is capable of controlling the drive motor to operate by using a transmission in an area in which precise torque control of the drive motor is possible, without using information detected by a stator position sensor provided in the drive motor of the hybrid vehicle. Accordingly, a drive motor control precision is improved when a rotor position sensor does not operate normally, thereby preventing a vehicle shutdown from occurring.

6 Claims, 5 Drawing Sheets

(51) Int. Cl.
*B60W 20/00* (2016.01)
*B60W 30/188* (2012.01)
(52) U.S. Cl.
CPC . *B60W 2510/081* (2013.01); *B60W 2510/083* (2013.01); *B60W 2710/083* (2013.01)

METHOD AND SYSTEM FOR DRIVING HYBRID VEHICLE

CROSS REFERENCE TO RELATED APPLICATION

The present application is based on and claims the priority to Korean Patent Application No. 10-2018-0053563, filed May 10, 2018, the entire contents of which is incorporated herein for all purposes by this reference.

TECHNICAL FIELD

The present disclosure relates generally to a method and a system for driving a hybrid vehicle. More particularly, the present disclosure relates to a method and a system for driving a hybrid vehicle, wherein when a rotor position sensor detecting a rotor position in a drive motor of the hybrid vehicle does not operate normally, the hybrid vehicle enables the drive motor to operate by using a transmission in an area in which precise torque control of the drive motor is possible.

BACKGROUND

Generally, as global warming and environmental pollution are getting worse, the research and development of environmentally-friendly vehicles is actively being pursued and thus the market of environmentally-friendly vehicles is expanding to minimize the environmental pollution in the automobile industry.

Instead of using an engine generating a driving force by burning fossil fuels, an electric vehicle, a hybrid vehicle, and a plug-in hybrid vehicle as environmentally-friendly vehicles using an electric motor that generates a driving force by using electrical energy are on the market worldwide. The hybrid vehicle of the environmentally-friendly vehicles using electrical energy is provided with at least two different driving means, and normally, selectively or cooperatively operates the electric motor and a combustion engine, with the electric motor and the combustion engine provided as the driving means.

Due to such characteristics of a drivetrain of the hybrid vehicle, the hybrid vehicle can be driven in an electric vehicle mode (EV mode) that drives a vehicle by using the electric motor alone. Control of the electric motor is very important for the hybrid vehicle to drive in the EV mode, and particularly, for the control of the electric motor, it is important to detect a rotor position of the rotor provided in the electric motor.

According to a normal electric motor control method, a rotor position sensor such as a resolver is provided in the electric motor in order to detect the rotor position of the electric motor, and rotor position information detected by the rotor position sensor is used to control the electric motor. In addition, when the rotor position sensor used as one of the normal electric motor control methods is out of order or malfunctions, well-known is a sensorless control method controlling the electric motor based on a back electromotive force of the electric motor without using the rotor position sensor.

Though the sensorless control method enables fail-safe driving of the hybrid vehicle when the rotor position sensor of the hybrid vehicle does not operate normally, the sensorless control method is lower in a rotor position detection precision than the rotor position sensor, which makes precise torque control of the electric motor impossible. Accordingly, when the sensorless control method is used to control the electric motor, it is impossible to perform the precise torque control of the electric motor, which limits the driving performance, driving time and distance of a vehicle during the fail-safe driving.

The foregoing is intended merely to aid in the understanding of the background of the present disclosure, and is not intended to mean that the present disclosure falls within the purview of the related art that is already known to those skilled in the art.

SUMMARY

Accordingly, the present disclosure has been made keeping in mind the above problems occurring in the related art, and the present disclosure is intended to propose a method and a system for driving a hybrid vehicle, wherein when a rotor position sensor detecting a rotor position in a drive motor of the hybrid vehicle does not operate normally, the hybrid vehicle enables the drive motor to operate by using a transmission in an area in which precise torque control of the drive motor is possible.

In order to achieve the above object, according to one aspect of the present disclosure, there is provided a method of driving a hybrid vehicle having a structure configured in such a manner that a transmission and a drive motor are directly connected to each other, and the drive motor is connected by a clutch to an engine, the method including: determining whether the hybrid vehicle is driven in a sensorless control mode or not, the sensorless control mode controlling the drive motor by using an estimated rotor position value determined based on an electric current and a voltage of the drive motor without using information detected by a stator position sensor provided in the drive motor; determining whether a torque command and a rotating speed of the drive motor are in a predetermined excessive error area or not, by referring to an error map provided by mapping in advance a difference between the estimated rotor position value and an actually measured rotor position value of the drive motor, and a relationship between a torque and the rotating speed of the drive motor, in the sensorless control mode; and determining a transmission stage of the transmission such that the drive motor operates in a torque and a rotating speed outside the excessive error area.

According to one embodiment of the present disclosure, determining whether the rotating speed of the drive motor is in the excessive error area may include limiting the torque command of the drive motor to a value less than a predetermined value of the torque command in the sensorless control mode.

According to one embodiment of the present disclosure, the determining of the transmission stage may be changing the transmission stage into a transmission stage in which at least the torque or the rotating speed of the drive motor decreases.

In order to achieve the above object, according to another aspect of the present disclosure, there is provided a system for driving a hybrid vehicle, the system including: a drive motor and an engine; a clutch connecting or disconnecting a rotating shaft of the drive motor and a rotating shaft of the engine; a transmission connected to the rotating shaft of the drive motor; an error map provided by mapping in advance a difference between an estimated rotor position value determined based on an electric current and a voltage of the drive motor without using information detected by a stator position sensor provided in the drive motor and an actually measured rotor position value of the drive motor, and a relationship between a torque and a rotating speed of the drive motor; and a transmission controller determining a transmission stage of the transmission such that the drive motor operates in a torque and a rotating speed thereof outside an excessive error area when a torque command and the rotating speed of the drive motor are in a predetermined excessive error area, referring to the error map in a sensorless control mode controlling the drive motor by using the estimated rotor position value.

According to one embodiment of the present disclosure, in the sensorless control mode, the transmission controller may perform limiting the torque command of the drive motor to a value equal to or less than a predetermined value of the torque command.

According to one embodiment of the present disclosure, in the sensorless control mode, the transmission controller may change the transmission stage to a stage in which at least the torque or the rotating speed of the drive motor decreases.

According to the method and the system for driving the hybrid vehicle, when the rotor position sensor in the drive motor of the hybrid vehicle does not operate normally and thus the rotor position value is determined to control the drive motor, the hybrid vehicle can control the drive motor by using the transmission such that the drive motor does not operate in an area where difference between the estimated rotor position value and the actually measured rotor position value is considerable.

Accordingly, according to the method and the system for driving the hybrid vehicle, even during hybrid vehicle driving in which the estimated rotor position value is used to control the drive motor, a drive motor control precision is improved, thereby preventing a vehicle shutdown from occurring, and securing an improved driving performance even during fail-safe driving in which the rotor position sensor malfunctions.

BRIEF DESCRIPTION OF THE DRAWINGS

The above and other objects, features and other advantages of the present disclosure will be more clearly understood from the following detailed description when taken in conjunction with the accompanying drawings, in which.

DETAILED DESCRIPTION

Hereinbelow, reference will now be made in greater detail to various embodiments of a method and a system for driving a hybrid vehicle with reference to the accompanying drawings.

Figure 1:
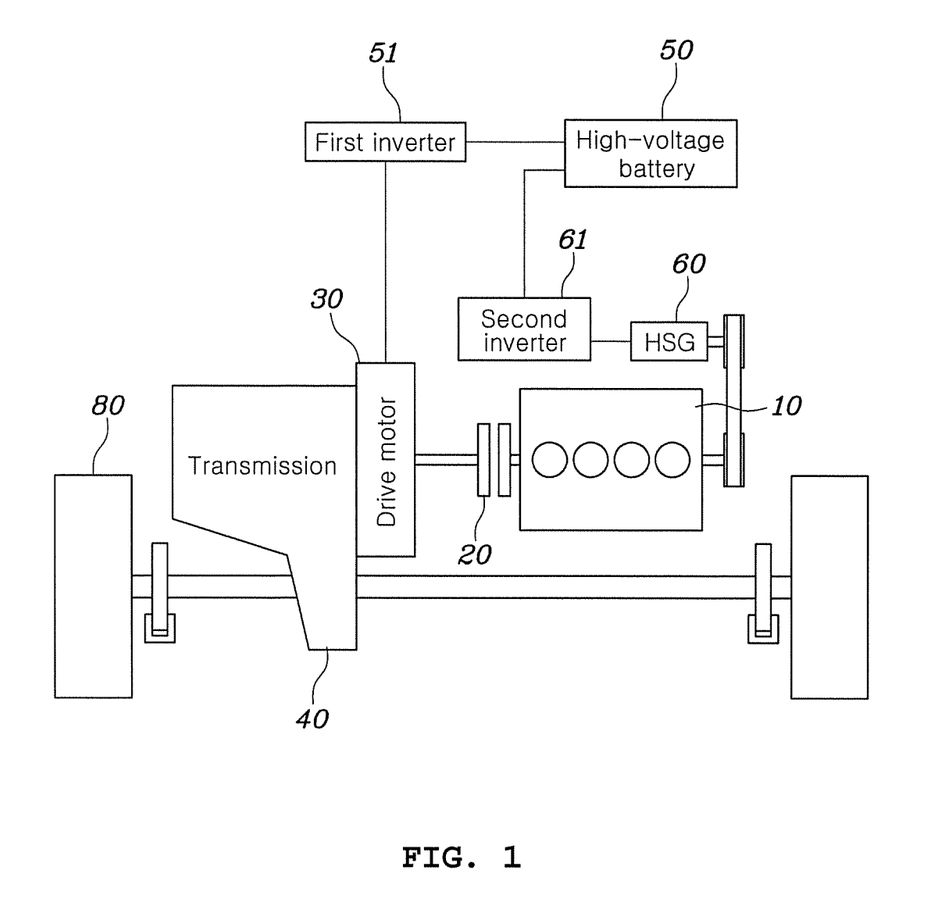
FIG. 1 is a view showing one example of a drivetrain of a hybrid vehicle to which a method and a system for driving a hybrid vehicle is applied according to various embodiments of the present disclosure.

FIG. 1 is a view showing one example of a drivetrain of a hybrid vehicle to which the method and the system for driving the hybrid vehicle is applied according to various embodiments of the present disclosure.

Referring to FIG. 1, according to various embodiments of the present disclosure, the drivetrain of the hybrid vehicle may be a transmission mounted electric device (TMED) type in which a rotating shaft of the drive motor 30 is directly connected to a transmission 40.

A drivetrain of a TMED-type hybrid vehicle may include an engine 10, a drive motor 30, a clutch 20 provided between the engine 10 and the drive motor 30, and the transmission 40 to which an output terminal of the drive motor 30 is connected.

With the clutch 20 connected or disconnected between the engine 10 and the drive motor 30, the TMED-type hybrid vehicle is driven by using the engine 10 and the drive motor 30 combined (HEV mode) or by using the engine 10 alone (EG mode), and when the TMED-type hybrid vehicle is driven by using the drive motor 30 alone without using the engine 10 (EV mode), the clutch 20 is opened and the engine 10 is disconnected to the transmission 40.

For example, during the starting or low-speed driving of the TMED-type hybrid vehicle, the drive motor 30 having high efficiency at a low rpm is used to drive the vehicle, and when the vehicle is driven at a predetermined speed, a hybrid starter & generator (HSG) 60 starts the engine 10 and simultaneously uses the outputs of the engine 10 and the drive motor 30 to drive the vehicle.

Though FIG. 1 shows the TMED-type hybrid vehicle as one example, the present disclosure is not limited to this example, and various embodiments of the present disclosure can be widely applied to the hybrid vehicle having the drivetrain in which the engine 10, the drive motor 30, and the transmission 40 are connected to each other.

The outputs of the engine 10 and the drive motor 30 are changed by the transmission 40, and then are transmitted to a drive shaft, and finally are transmitted to a driving wheel 80.

Accordingly, whether to drive the hybrid vehicle in the EV mode or in the HEV mode is determined by controlling the operation of the clutch 20, and the clutch 20 is normally operated by a hydraulic system.

Generally, determining a torque command of the drive motor 30 and determining pressure of the clutch 20, including determining fuel injection time of the engine 10, are controlled by a hybrid control unit (HCU).

Furthermore, the control of the drive motor 30 is performed by a motor control unit (MCU). By operating a first inverter 51, the MCU enables a direct-current (DC) power stored in a high-voltage battery 50 to be applied to the drive motor 30 in a three-phase AC voltage. Of course, in a regenerative mode, which is a state (an inertia driving state), in which the drive motor 30 can operate as a generator, the MCU converts an electric power generated by the drive motor 30 to the DC power, and can provide the DC power as a charge power of the high-voltage battery 50. A second inverter 61 converts the DC power of the high-voltage battery 50 to an alternate-current (AC) power driving the HSG 60, and when the engine 10 is driven, the AC power generated in the HSG 60 is converted to the DC power in order to provide the charge power of the high-voltage battery 50. The MCU can control the operation of the drive motor 30 and the HSG 60.

In addition, a transmission control of the transmission 40 can be controlled by a transmission control unit (TCU), and an engine torque control can be controlled by an engine management system (EMS).

The TCU normally performs transmission such that the engine 10 operates in the range of maximum efficiency. For example, when the maximum efficiency of the engine 10 ranges from 2000 to 3000 rpm, in consideration of a speed of a hybrid vehicle, the TCU performs a vehicle transmission to a transmission stage having a transmission ratio at which an engine 10 of the vehicle can rotate at 2000 to 3000 rpm.

A transmission control performed by the TCU is performed the same way even in the EV mode whereby the hybrid vehicle is driven by using the drive motor 30 alone. When the method of driving the hybrid vehicle is changed from the EV mode to the EG mode where only an engine is used, the method of driving the hybrid vehicle realizes an efficient mode conversion by preventing impacts that may be caused when a driving force of the engine 10 is transmitted to the drive motor 30 by the clutch 20 connecting the drive motor 30 and the engine 10.

Figure 2:
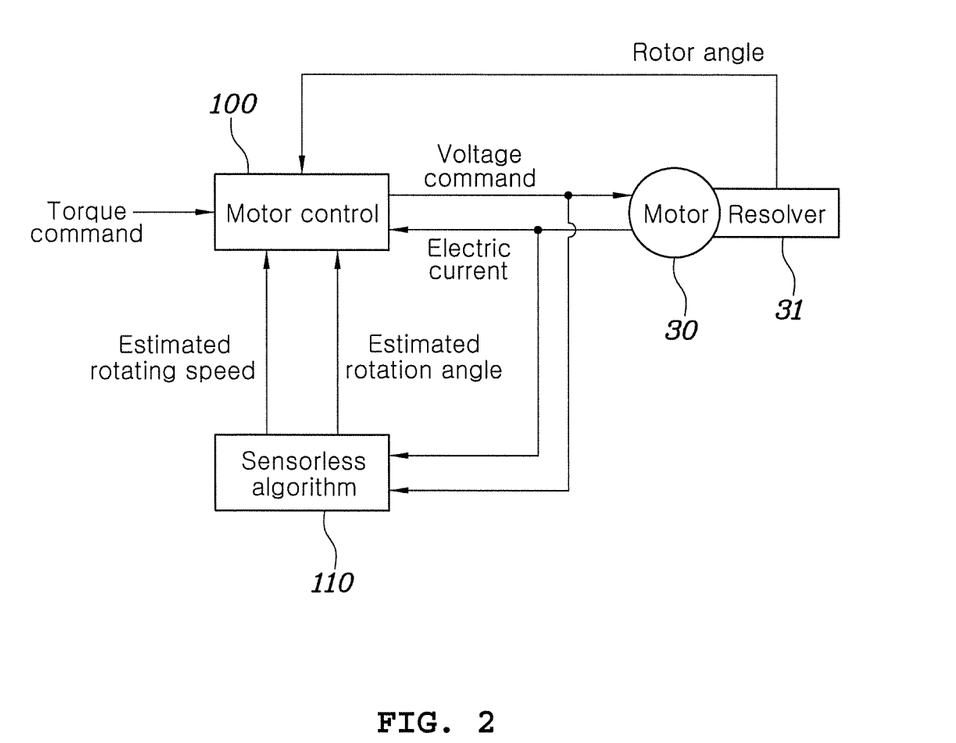
FIG. 2 is a block diagram describing a motor control method to which the method and the system for driving the hybrid vehicle are applied according to various embodiments of the present disclosure.

FIG. 2 is a block diagram describing a motor control method to which the method and the system for driving the hybrid vehicle are applied according to various embodiments of the present disclosure.

As shown in FIG. 2, a motor control method to which the method and the system for driving the hybrid vehicle are applied according to the various embodiments of the present disclosure includes a normal method in which the MCU 100 controls the drive motor 30 by using a rotor angle information detected by using a rotor position sensor such as the resolver 31 provided in the drive motor 30, and a sensorless control method in which the sensorless algorithm 110 is applied to estimate a rotor position value determined by using information such as at least an electric current or a voltage of the drive motor 30, and then the estimated rotor position value is used to control the drive motor 30.

When the sensorless algorithm 110 does not normally receive a rotor position detection signal output from the drive motor 30, the sensorless algorithm 110 uses other factors relative to the drive motor 30 in order to estimate rotor position information.

Figure 3:
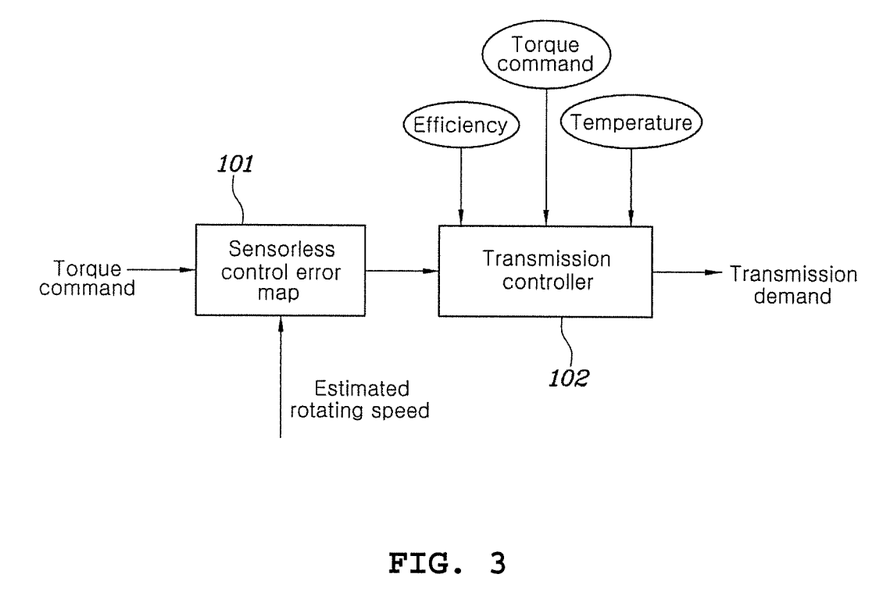
FIG. 3 is a block diagram showing a controller of the system for driving the hybrid vehicle according to one embodiment of the present disclosure.

FIG. 3 is a block diagram showing a controller of the system for driving the hybrid vehicle according to one embodiment of the present disclosure.

Referring to FIG. 3, according to one embodiment of the present disclosure, the controller of the system for driving the hybrid vehicle may include a sensorless control error map 101 and a transmission controller 102.

In the sensorless control of the drive motor 30 of the hybrid vehicle, the sensorless control error map 101 may be a data map predetermining an excessive error area in which difference between an actually measured rotor position value of the rotor of the drive motor 30 and the estimated rotor position value estimated by the sensorless control method is larger than a predetermined reference value.

Figure 4:
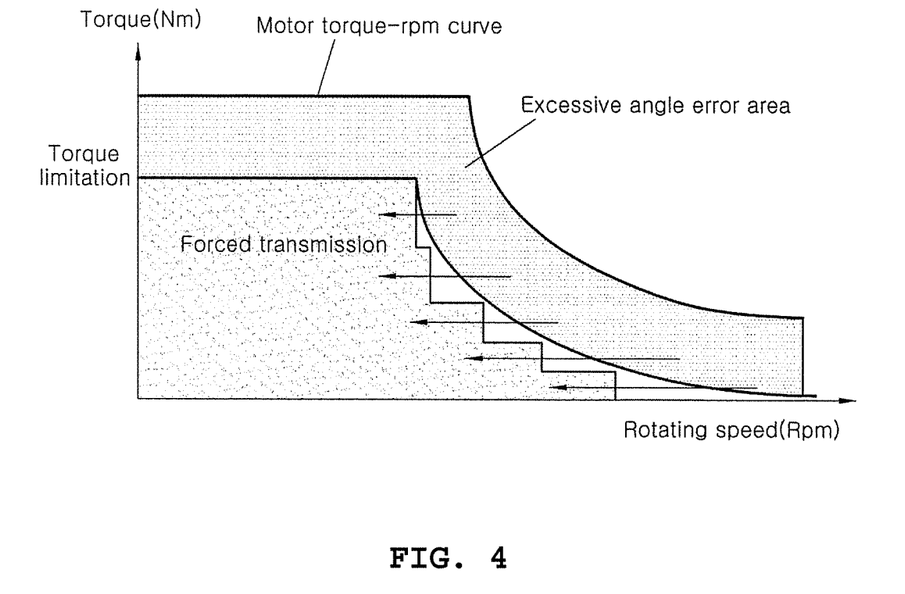
FIG. 4 is a graph showing one example of a sensorless control error map to which the system for driving the hybrid vehicle is applied according to one embodiment of the present disclosure.

FIG. 4 is a graph showing one example of the sensorless control error map to which the system for driving the hybrid vehicle is applied according to one embodiment of the present disclosure.

As shown in FIG. 4, the drive motor 30 can operate within a predetermined range of the torque and the rotating speed of the drive motor 30 relative to each other. As shown in FIG. 4, a torque-rpm curve of the drive motor 30 is a curve showing the upper limit line of the range in which the drive motor 30 can operate, and the drive motor 30 can operate in the range.

Meanwhile, in the sensorless control, as the drive motor 30 operates at a high torque or a high rpm, the angle error becomes more considerable, referring to the difference (hereinbelow, referred to as "an angle error") between the estimated rotor position value determined by using information such as at least an electric current or a voltage of the drive motor 30 and the actually measured rotor position value measured when the drive motor 30 is actually driven, based on at least the electric current or the voltage of the drive motor 30.

TABLE

| Torque | Angle error Rotating speed [rpm] | | | | | | | | | | | |
|---|---|---|---|---|---|---|---|---|---|---|---|---|
| [Nm] | 500 | 1000 | 1500 | 2000 | 2500 | 3000 | 3500 | 4000 | 4500 | 5000 | 5500 | 6000 |
| 150 | 0.03817 | 0.089737 | 0.118194 | 0.15331 | 0.186682 | | | | | | | |
| 100 | 0.039623 | 0.076865 | 0.088483 | 0.112122 | 0.13758 | 0.146318 | 0.186896 | | | | | |
| 50 | 0.008848 | 0.036823 | 0.041971 | 0.053076 | 0.05838 | 0.063447 | 0.070051 | 0.07913 | 0.097628 | 0.124158 | 0.208205 | |
| 0 | 0.018605 | 0.004598 | 0.009306 | 0.00948 | 0.014197 | 0.010205 | 0.01572 | 0.003573 | 0.006304 | 0.018167 | 0.036115 | 0.05991 | rotor position sensor such as the resolver 31, the sensorless algorithm 110 can estimate a rotation angle of a rotor of the drive motor 30 based on at least the electric current or the voltage input to the drive motor 30. Further, the sensorless algorithm 110 can estimate a rotating speed of the rotor by using a rotation-angle change of the rotor.

A relationship between the rotation angle of the rotor of the drive motor and a back electromotive force of the drive motor may be used to estimate the back electromotive force of the drive motor based on the electric current or the voltage of an input terminal of the drive motor, and the estimated back electromotive force may be used to estimate the rotation angle of the rotor of the drive motor.

According to various embodiments of the present disclosure, without using the rotor position sensor provided in the The following table shows measured angle errors based on the torque and the rpm of the drive motor 30, and that the angle errors are large in an area of the high torque or the high rpm of the drive motor 30.

Accordingly, as shown in FIG. 4, in the torque-rpm curve of the drive motor 30, the sensorless control error map 101 can predetermine an area close to the upper limit line in which the drive motor 30 can operate as an excessive angle error area, and the range of the excessive angle error area may be properly adjusted by experiments.

The controller 102 may be an electric circuitry that executes instructions of software which thereby performs various functions described hereinafter.

The transmission controller 102 is a part determining transmission time of the transmission 40 provided in the hybrid vehicle. Normally, the transmission controller 102 determines the transmission time, based on the efficiency (an efficient rpm) of the engine 10, the torque command determined by an accelerator pedal operation of a driver, an outside temperature, and a vehicle speed, etc.

According to one embodiment of the present disclosure, in the sensorless control mode of the hybrid vehicle, when the torque command of the drive motor 30 and the rotating speed of the drive motor 30 (the rotating speed of the rotor) estimated by the sensorless control are in the predetermined excessive error area, the transmission controller 102 can forcibly change the transmission stage of the transmission 40 such that the drive motor 30 can operate at the torque and the rpm outside the excessive error area by referring to the sensorless control error map 101. For example, when the rotating speed of the drive motor 30 (the rotating speed of the rotor) is in the predetermined excessive error area, the transmission controller 102 can change the transmission stage of the transmission 40 to the transmission stage in which at least the torque or the rotating speed of the drive motor 30 decreases such that the drive motor 30 can operate at the torque and the rpm outside the excessive error area.

Figure 5:
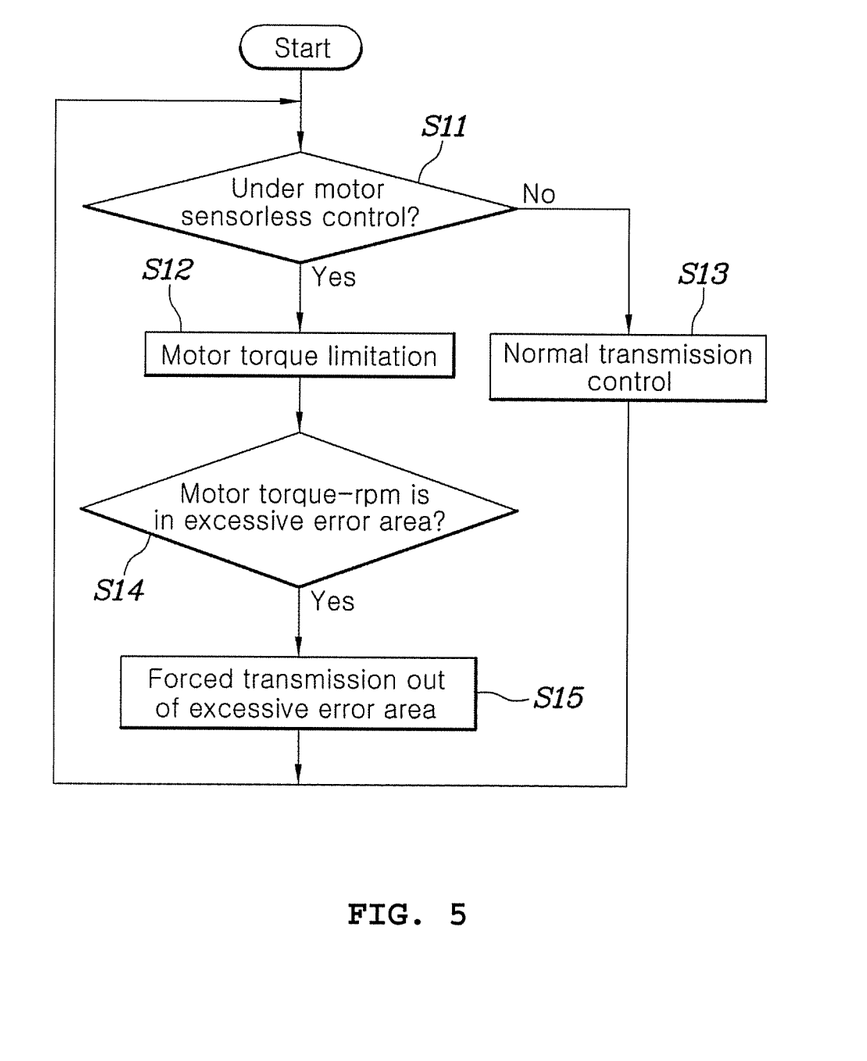
FIG. 5 is a flowchart showing the method of driving the hybrid vehicle according to one embodiment of the present disclosure.

FIG. 5 is a flowchart showing the method of driving the hybrid vehicle according to one embodiment of the present disclosure. Each step shown in the flowchart of FIG. 5 can be performed by the controller shown in FIG. 3.

First, the controller determines whether the drive motor 30 of the hybrid vehicle is controlled by the sensorless control mode (S11).

Next, in the sensorless control mode, the transmission controller 102 limits the torque command to a value equal to or less than a predetermined upper limit value of the torque command. That is, when the torque command input to the transmission controller 102 from an outside exceeds the upper limit value, the torque command is limited to the value equal to or less than the upper limit value (S12).

As shown in FIG. 4, since the drive motor 30 can generate a maximum torque at a low rpm area, the transmission controller 102 determines the upper limit value of the torque command such that the drive motor 30 is not in the excessive error area, and limits the torque command to the value less than the upper limit value.

Of course, when the rotor position information is actually measured by the rotor position sensor such as the resolver 31 provided in the drive motor 30, not by the sensorless control method, the transmission controller 102 can perform a normal transmission control.

As shown in FIG. 4, when the torque command and the estimated rotating speed input to the sensorless control error map 101 are in the excessive error area (S14), the transmission controller 102 first deals with this condition before other control factors, and can determine and change the transmission stage of the transmission 40 such that the drive motor 30 operates at the torque and the rotating speed outside the excessive error area (S15).

When the rotor position sensor such as the resolver 31 does not operate normally, the drive motor 30 is controlled by the sensorless control mode, which may be regarded as fail-safe driving. Since when the vehicle is driven by using the drive motor 30 alone in the fail-safe driving, safety is more important than other driving factors, and thus it is the most important for the transmission controller 102 to control the drive motor 30 such that the drive motor 30 does not operate in the excessive error area. Accordingly, when the transmission controller 102 determines that the drive motor 30 operates in the excessive error area, the transmission controller 102 forcibly changes the transmission stage of the transmission 40 such that the drive motor 30 operates in the area in which the drive motor 30 can be efficiently controlled. For example, when the rotating speed of the drive motor 30 (the rotating speed of the rotor) is in the predetermined excessive error area, the transmission controller 102 can change the transmission stage of the transmission 40 to the transmission stage in which at least the torque or the rotating speed of the drive motor 30 decreases such that the drive motor 30 operates at the torque and the rotating speed outside the excessive error area.

Accordingly, according to various embodiments of the present disclosure, there is provided the method and the system for driving the hybrid vehicle, wherein when the rotor position sensor of the drive motor 30 in the hybrid vehicle does not operate normally and thus the rotor position value is estimated by using information such as at least an electric current or a voltage of the drive motor 30 to control the drive motor 30, the hybrid vehicle can control the drive motor 30 by using the transmission 40 such that the drive motor 30 does not operate in an area where difference between the estimated rotor position value and an actually measured rotor position value is considerable.

Accordingly, even during vehicle driving in which the estimated rotor position value is used to control the drive motor, a drive motor control precision is improved, thereby preventing a vehicle shutdown from occurring, and securing an improved performance even during fail-safe driving in which the rotor position sensor malfunctions.

Although a preferred embodiment of the present disclosure has been described for illustrative purposes, those skilled in the art will appreciate that various modifications, additions and substitutions are possible, without departing from the scope and spirit of the invention as disclosed in the accompanying claims.

What is claimed is:

1. A method of driving a hybrid vehicle having a structure configured in such a manner that a transmission and a drive motor are directly connected to each other, and the drive motor is connected by a clutch to an engine, the method comprising steps of:

determining, by a transmission controller, whether the hybrid vehicle is driven in a sensorless control mode or not, wherein the sensorless control mode is a mode in which the drive motor is controlled by using an estimated rotor position value determined based on an electric current and a voltage of the drive motor without using information detected by a stator position sensor provided in the drive motor;

determining, by the transmission controller, whether a torque command and a rotating speed of the drive motor are in a predetermined excessive error area or not, by referring to an error map provided by mapping in advance a difference between the estimated rotor position value and an actually measured rotor position value of the drive motor, and a relationship between a torque and the rotating speed of the drive motor, in the sensorless control mode; and determining, by the transmission controller, a transmission stage of the transmission such that the drive motor operates in a torque and a rotating speed outside the predetermined excessive error area, and controlling the transmission to operate according to the determined transmission stage.

2. The method of driving the hybrid vehicle of claim 1, wherein the step of determining whether the rotating speed of the drive motor is in the predetermined excessive error area includes limiting the torque command of the drive motor to a value less than a predetermined value of the torque command in the sensorless control mode.

3. The method of driving the hybrid vehicle of claim 1, wherein the step of determining the transmission stage includes changing the transmission stage into a transmission stage in which at least one of the torque or the rotating speed of the drive motor decreases.

4. A system for driving a hybrid vehicle, the system comprising:
- a drive motor and an engine;
- a clutch connecting or disconnecting a rotating shaft of the drive motor to or from a rotating shaft of the engine;
- a transmission connected to the rotating shaft of the drive motor;
- an error map provided by mapping in advance a difference between an estimated rotor position value determined based on an electric current and a voltage of the drive motor without using information detected by a stator position sensor provided in the drive motor and an actually measured rotor position value of the drive motor, and a relationship between a torque and a rotating speed of the drive motor; and
- a transmission controller configured to determine a transmission stage of the transmission such that the drive motor operates in a torque and a rotating speed thereof outside a predetermined excessive error area when a torque command and the rotating speed of the drive motor are in the predetermined excessive error area, referring to the error map in a sensorless control mode controlling the drive motor by using the estimated rotor position value, and to control the transmission to operate according to the determined transmission stage.

5. The system for driving the hybrid vehicle of claim 4, wherein in the sensorless control mode, the transmission controller is further configured to limit the torque command of the drive motor to a value equal to or less than a predetermined value of the torque command.

6. The system for driving the hybrid vehicle of claim 4, wherein in the sensorless control mode, the transmission controller is further configured to change the transmission stage to a transmission stage in which at least one of the torque or the rotating speed of the drive motor decreases.

* * * * *